April 5, 1932.  F. H. LOBB  1,852,171
MACHINE FOR MOLDING MOLTEN GLASS AND THE LIKE
Filed Feb. 1, 1919  9 Sheets-Sheet 1
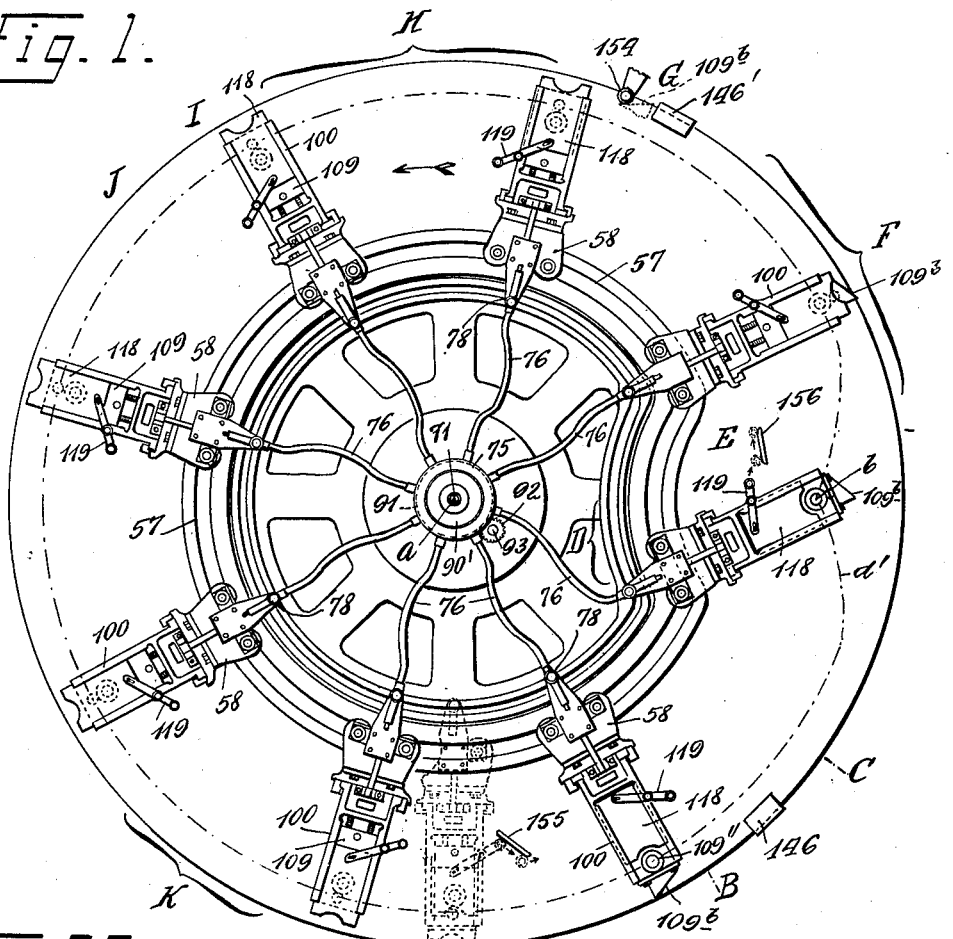
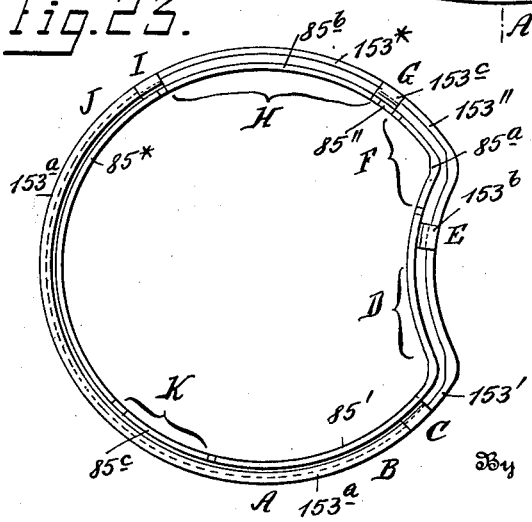
Inventor
Frank H. Lobb
By his Attorney
John Lotka

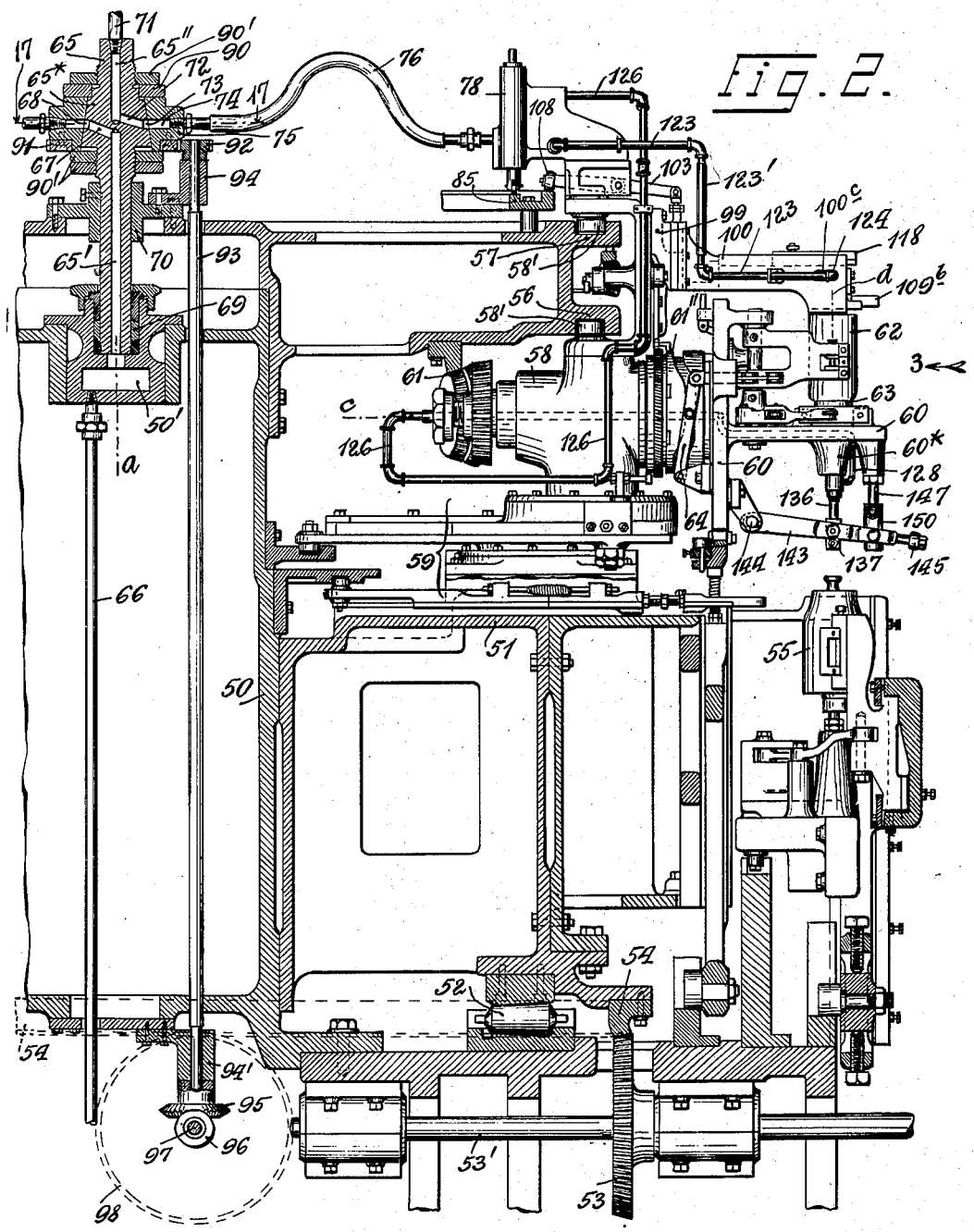

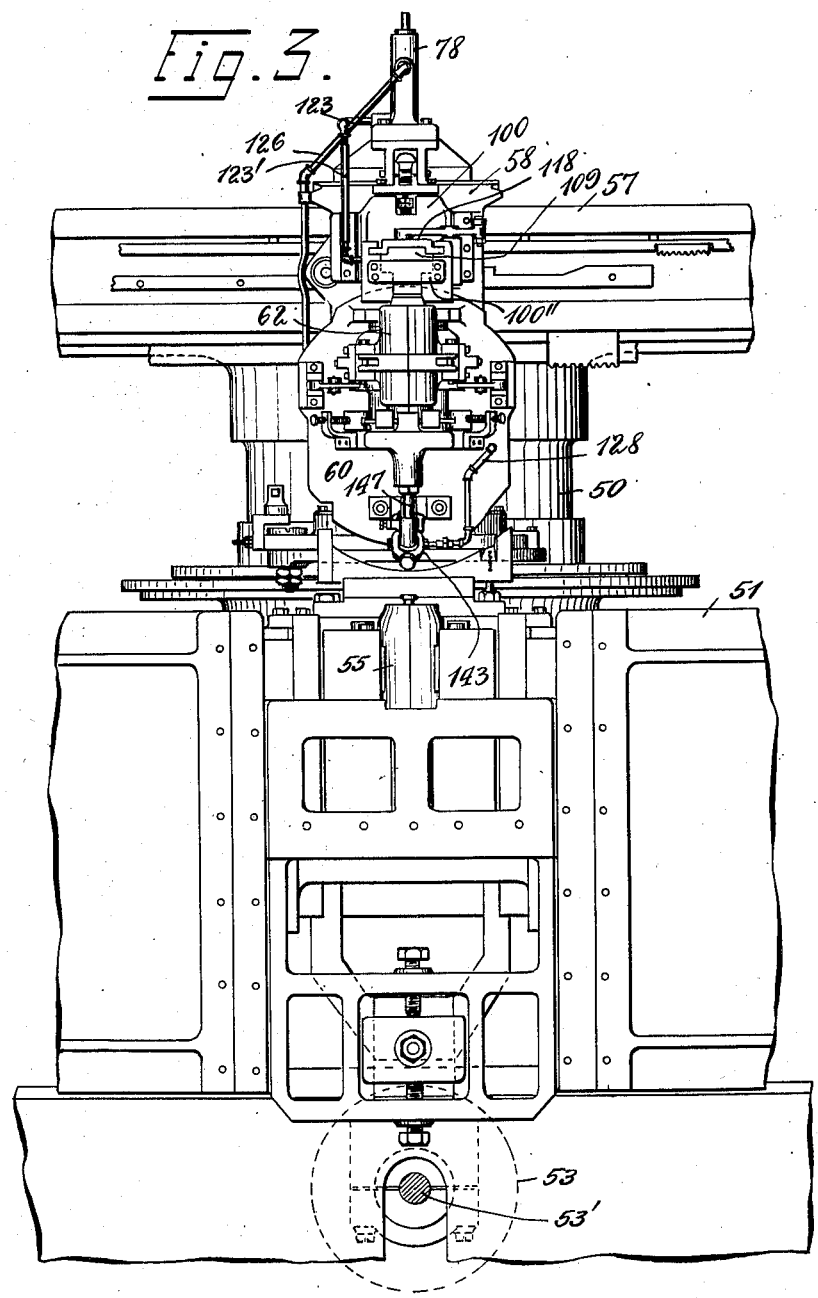

April 5, 1932. F. H. LOBB 1,852,171
MACHINE FOR MOLDING MOLTEN GLASS AND THE LIKE
Filed Feb. 1, 1919 9 Sheets-Sheet 4
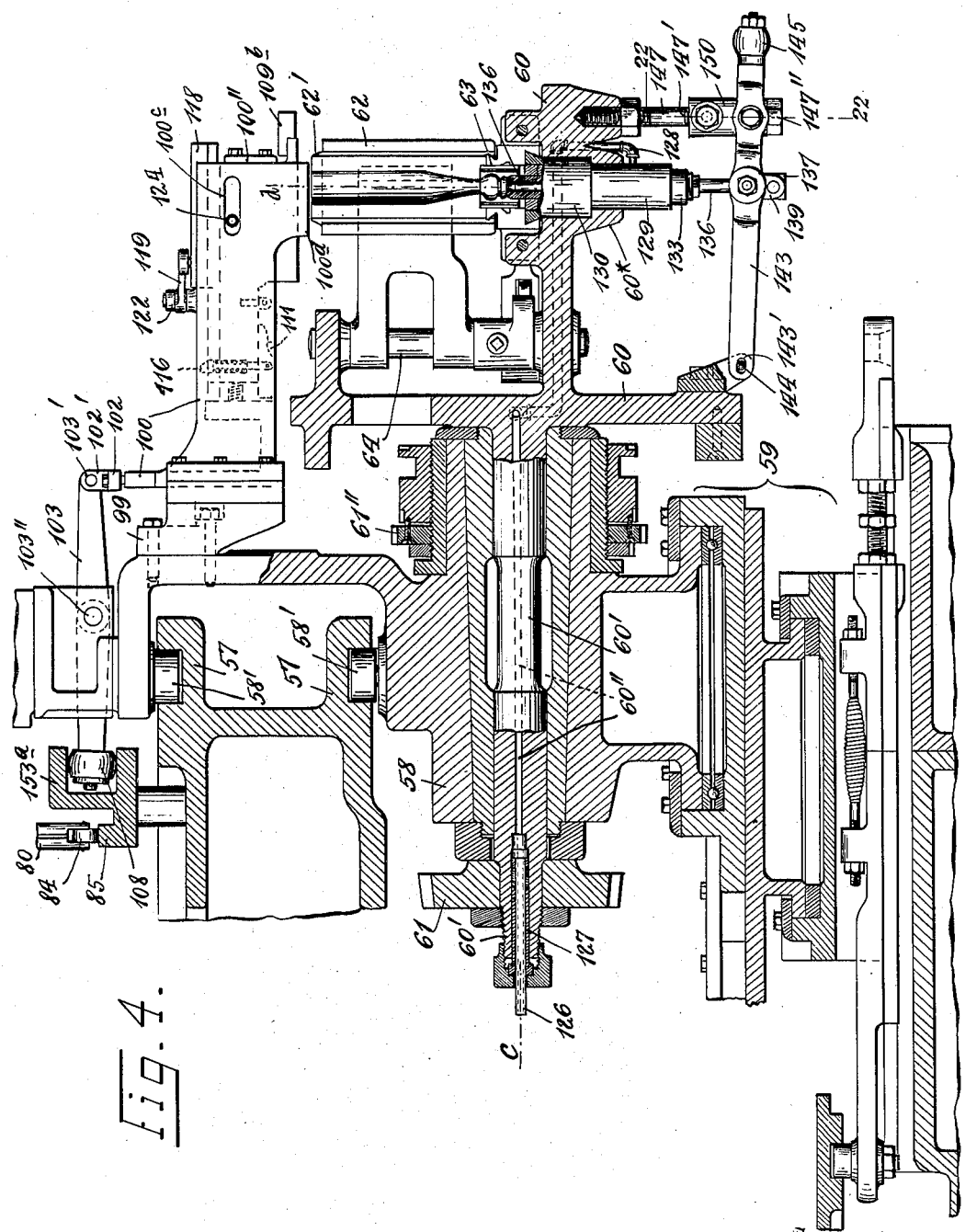
Inventor
Frank H. Lobb
By his Attorney
John Lotka April 5, 1932.   F. H. LOBB   1,852,171
MACHINE FOR MOLDING MOLTEN GLASS AND THE LIKE
Filed Feb. 1, 1919   9 Sheets-Sheet 5

Inventor
Frank H. Lobb
By his Attorney
John Lotka

April 5, 1932.  F. H. LOBB  1,852,171
MACHINE FOR MOLDING MOLTEN GLASS AND THE LIKE
Filed Feb. 1, 1919  9 Sheets-Sheet 6
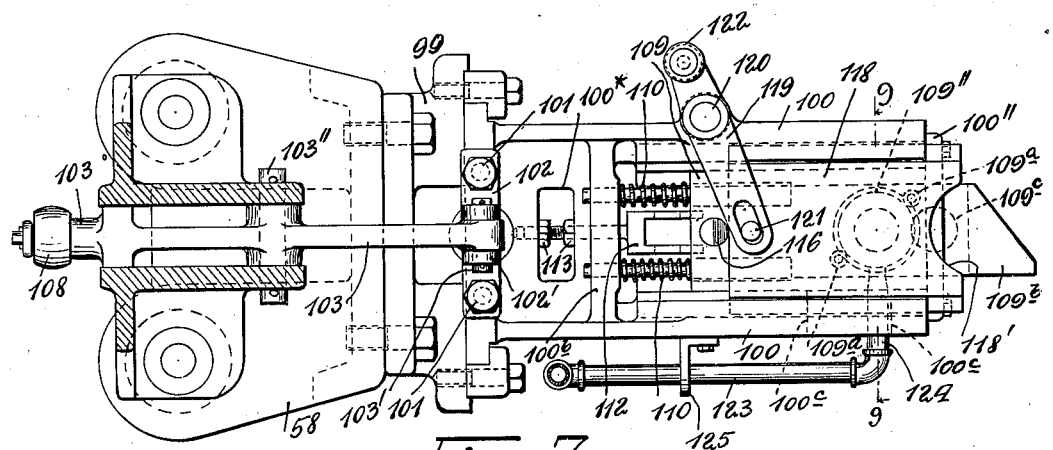
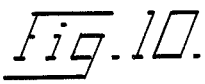
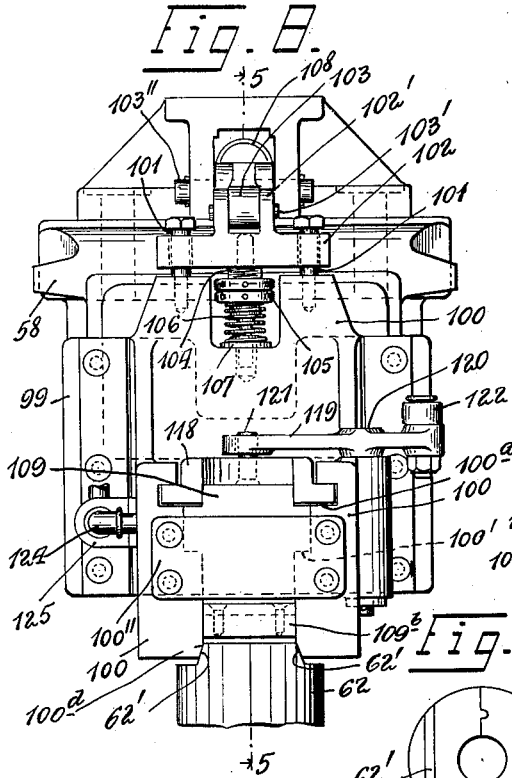
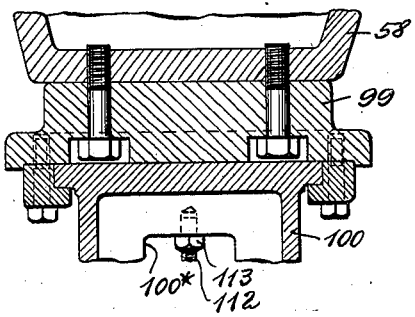
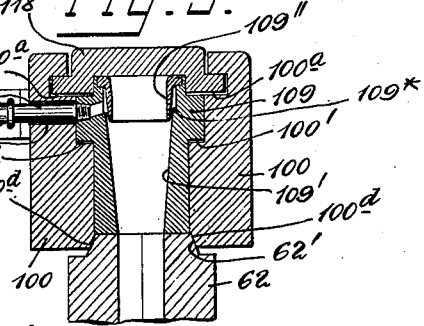
Inventor
Frank H. Lobb
By his Attorney
John Lotka April 5, 1932.                F. H. LOBB                1,852,171
              MACHINE FOR MOLDING MOLTEN GLASS AND THE LIKE
                Filed Feb. 1, 1919        9 Sheets-Sheet 7
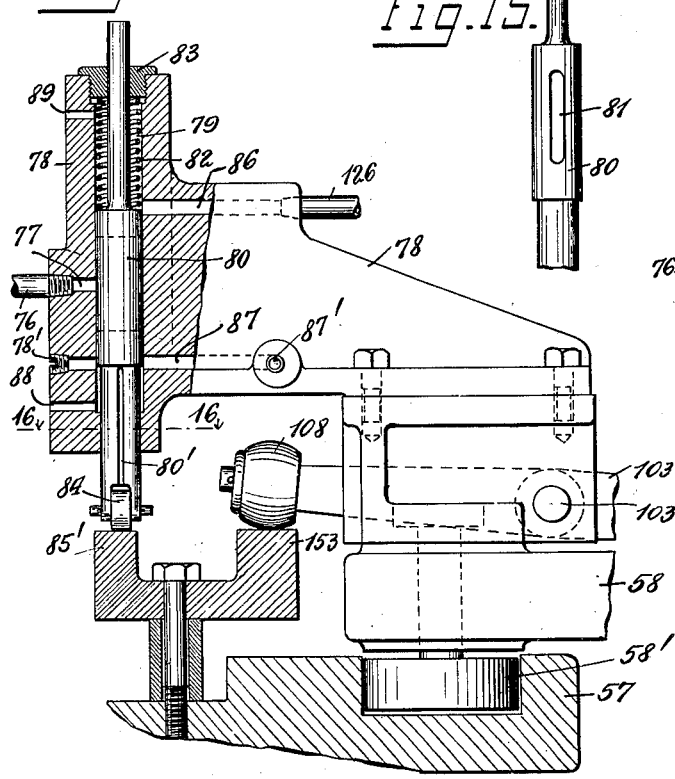
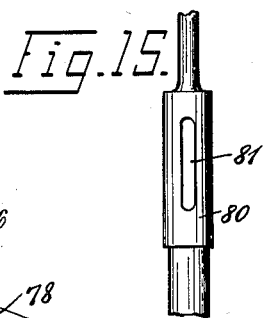
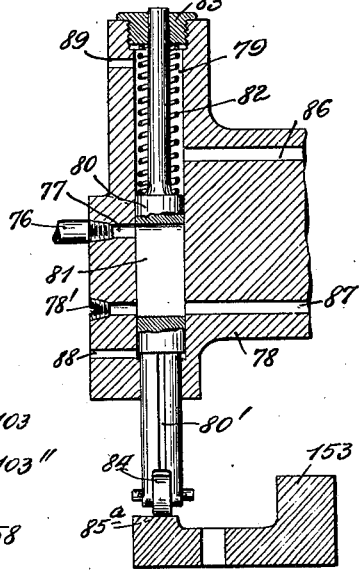
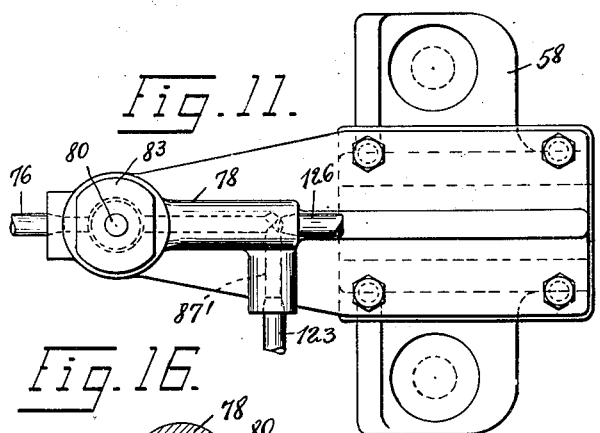
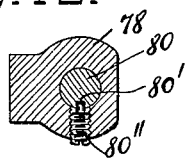
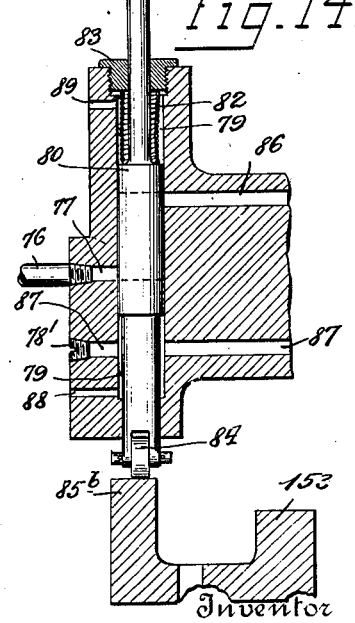
Inventor
Frank H. Lobb
By his Attorney
John Lotka

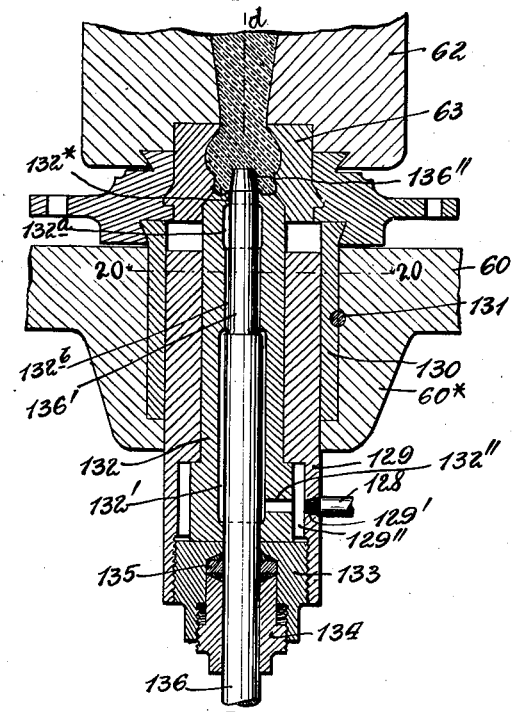

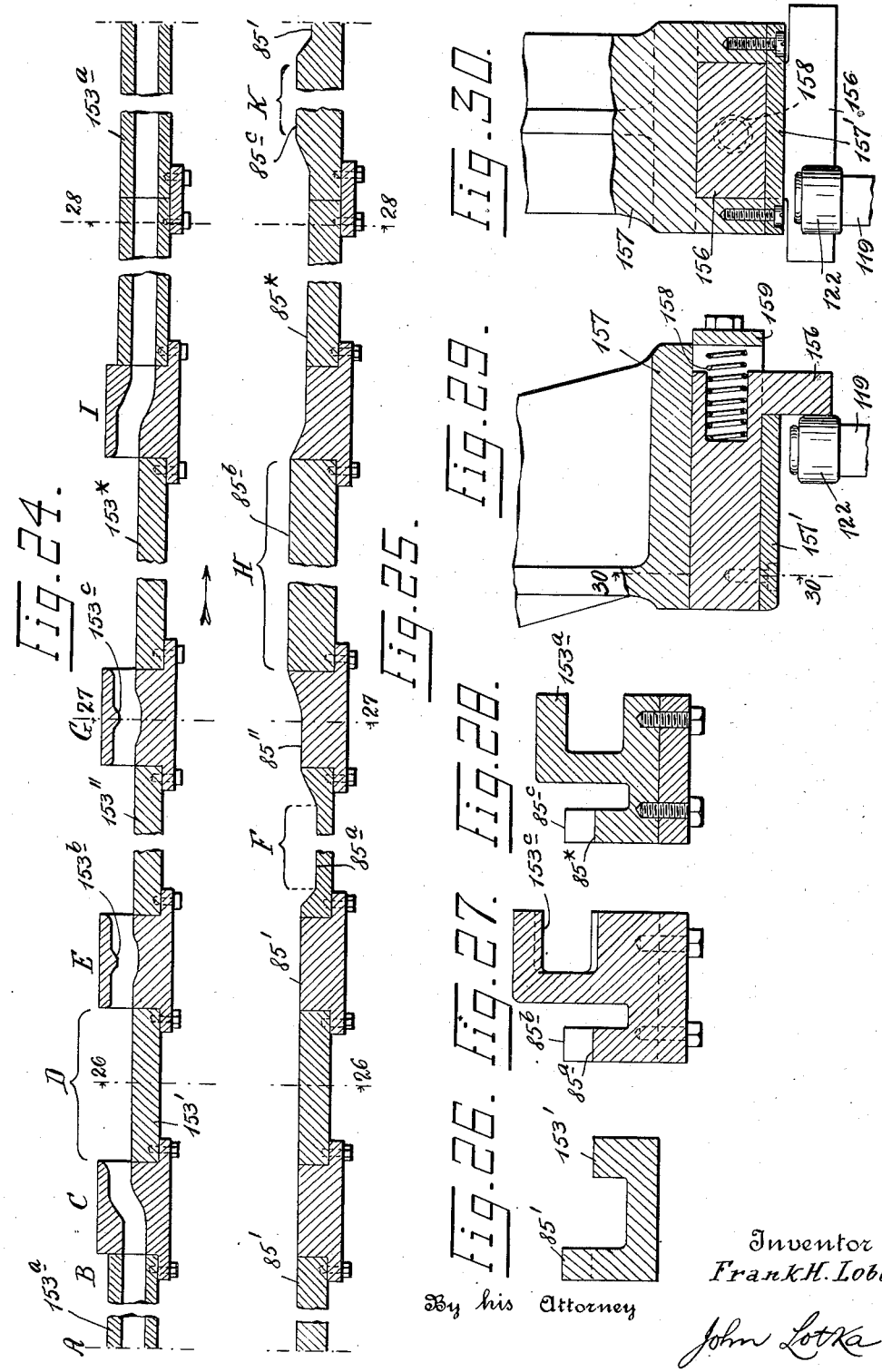

Patented Apr. 5, 1932

1,852,171

UNITED STATES PATENT OFFICE

FRANK H. LOBB, OF MILLVILLE, NEW JERSEY, ASSIGNOR, BY MESNE ASSIGNMENTS, TO HARTFORD-EMPIRE COMPANY, OF HARTFORD, CONNECTICUT, A CORPORATION OF DELAWARE

MACHINE FOR MOLDING MOLTEN GLASS AND THE LIKE

Application filed February 1, 1919. Serial No. 274,449.

My invention relates to machines for making glass bottles and similar articles, and has for its object to improve certain parts of the mechanism for the purpose of simplifying the construction and of rendering the operation more efficient and reliable. The novel features described and claimed hereinafter have been devised by me specifically for use in connection with a bottle-making machine of the type shown in the application for Letters Patent of the United States filed by Sydney L. Sears on August 19, 1914, Serial No. 857,464, that is to say, the purpose of my invention was primarily to improve the said Sears machine; however, it will be obvious that the novel features devise by me might be used in conjunction with machines other than that invented by Sears.

Figure 5:
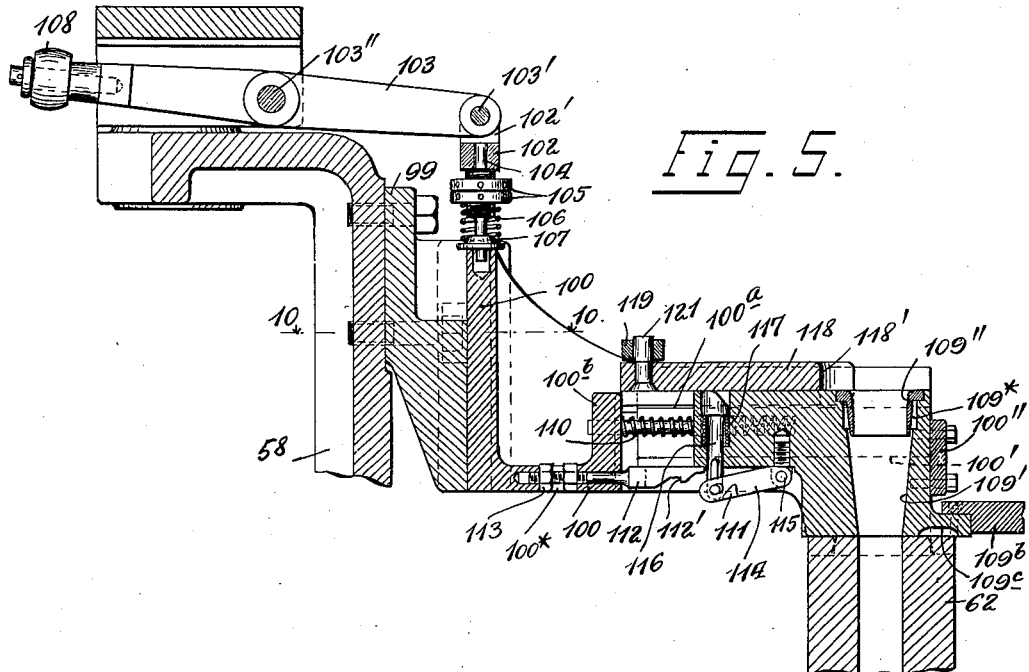
Figure 6:
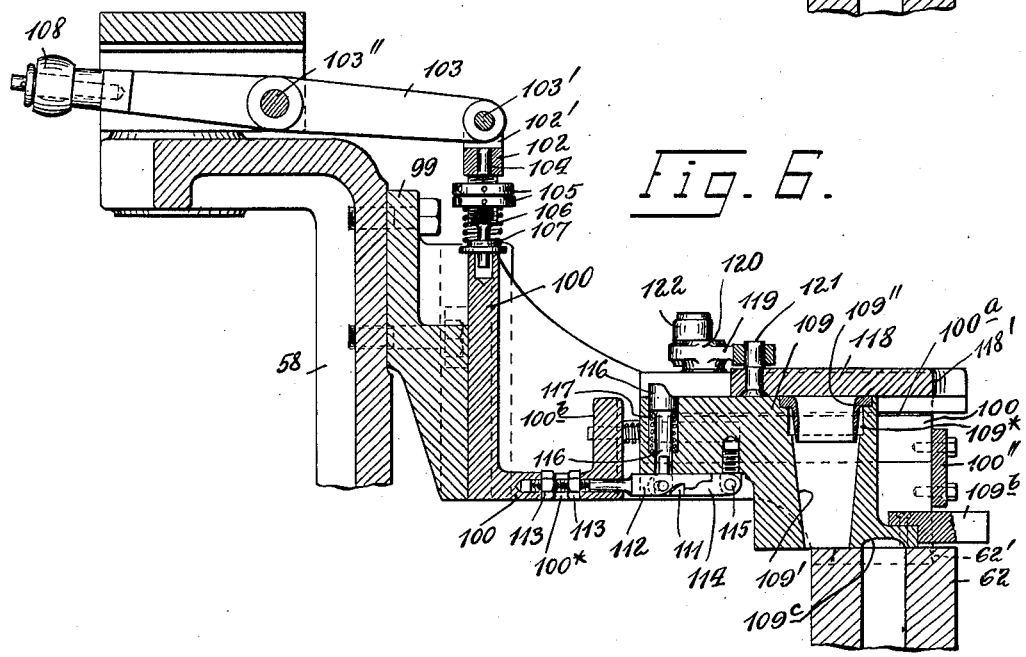

In the accompanying drawings, I have shown my improvements as applied to a machine of the Sears type, Fig. 1 being a partial plan view of the machine, largely in diagrammatic fashion; Fig. 2 is a partial vertical section through the center or axis of the machine; Fig. 3 is a partial elevation, looking from the right in Fig. 2; Fig. 4 is a section showing on an enlarged scale, and in a slightly different position, the parts appearing at the upper right-hand corner of Fig. 2; Figs. 5 and 6 are vertical sections on the longitudinal center of Fig. 7, the latter being a plan view of the parts shown at the upper right-hand corner of Fig. 4, the position of parts in Fig. 6 being different from that in Fig. 5; Fig. 8 is an end view of the same parts, and also indicates, at 5—5 the plane of the sections Figs. 5 and 6; Fig. 9 is a section on line 9—9 of Fig. 7; Fig. 9ª is a top view of a blank mold in its inverted position; Fig. 10 is a horizontal section on line 10—10 of Fig. 5; Fig. 11 is a detail plan view of a portion of a carriage with adjacent parts; Fig. 12 is a corresponding elevation, with parts in section on the central longitudinal plane of Fig. 11; Figs. 13 and 14 are partial vertical sections, on the same plane as Fig. 12, and showing different positions of the parts; Fig. 15 is a detail elevation of a valve shown in Figs. 12 to 14; Fig. 16 is a horizontal section on line 16—16 of Fig. 12; Fig. 17 is a partial horizontal section on line 17—17 of Fig. 2; Fig. 18 is a central vertical section showing a portion of the blank mold in the filling position, together with the plunger in one of its positions; Fig. 19 shows the upper portion of Fig. 18, with the plunger in another position; Fig. 20 is a horizontal section on line 20—20 of Fig. 18; Fig. 21 is a vertical section on line 21—21 of Fig. 18; Fig. 22 is a partial section on line 22—22 of Fig. 4; Fig. 23 is a diagrammatic plan view showing the position of two sets of cams located on top of the machine; Fig. 24 is a vertical section showing one of the sets of cams in developed view; Fig. 25 is a view corresponding to Fig. 24, but showing a developed view of the other set of cams illustrated in Fig. 23; Figs. 26, 27 and 28 are partial vertical sections taken on the correspondingly-numbered lines of Figs. 24 and 25; Fig. 29 is an elevation of another cam, with parts in section; and Fig. 30 is a cross section on line 30—30 of Fig. 29.

In its general features, the Sears machine is constructed as follows: A stationary vertical column 50 forms a central axle about which is adapted to revolve a table or frame 51, supported, for instance, on rollers 52 journaled in stationary bearings, and receiving a continuous rotary movement, about the axis $a$ of the column, as by means of a gear 53 on a drive shaft 53' journaled in stationary bearings, said gear meshing with a crown gear 54 on said frame. The latter carries, at regular intervals, blow molds 55, adapted to be opened and closed, as well as raised and lowered, by suitable cam-operated mechanism, as set forth in the Sears application mentioned above. Inasmuch as my present improvements do not relate to the blow-mold mechanism proper, I have deemed it sufficient to indicate the general features thereof in Figs. 2 and 3, without describing it in detail. The Sears machine is provided at its upper portion, with two stationary superposed tracks 56 and 57 of the peculiar shape shown in Fig. 1, that is to say, each track comprises a major portion coaxial with the column 50, and a minor re-entrant or dwell portion the center or axis $b$ of which is parallel to the axis $a$ about which the frame 51 revolves. Along the tracks 56, 57 are adapted to travel the rollers 58' of a carriage 58, each carriage having two pairs of rollers, one in advance of the other, so that a definite position is given to the carriage at each point of its path. There is one such carriage for each of the blow-molds 55 (an eight-mold machine being assumed in the drawings), and each carriage is connected with the rotating table or frame 51 by means of a peculiar coupling indicated at 59 which compels the carriage to move with the frame 51 along the tracks 56, 57, yet permits said carriage to swing in the manner indicated at the right of Fig. 1, when traveling along the re-entrant portion of the tracks. The details of this connection or coupling 59 are disclosed in the above-mentioned Sears application. Each carriage is formed with a horizontal bearing in which an invertible head 60 is mounted to turn about a horizontal axis $c$ which intersects the axis $a$ as long as the carriage is traveling along the concentric major portion of the tracks 56, 57, but intersects the axis $b$ when both pairs of carriage rollers 58' are in engagement with the re-entrant track portions. This head (the position of which is reversed at proper times by mechanism a portion of which is indicated at 61) carries a blank mold 62 and a neck mold 63 adapted to co-operate therewith at times, said neck mold also co-operating at other times with the corresponding above-mentioned blow mold 55. The axis of the blank mold and of the co-operating neck mold is indicated at $d$, and during the travel of the carriage, said axis $d$ describes the path $d'$ (Fig. 1) which is somewhat heart-shaped, having its major portion concentric with the axis $a$, and a re-entering angle or point in line with the axis $b$. That is to say, the molds 62, 63 are at such a distance from the roller portion of the carriage that the mold axis $d$ will coincide with the axis $b$ while the rollers 58' travel on the re-entrant portion of the tracks, so that during that period, the mold axis will remain stationary notwithstanding the continued travel of the carriage along said tracks; this temporary rest or dwell of the mold is utilized for supplying thereto the charge of glass. The blank mold 62 and neck mold 63 are made of separable sections, being opened and closed at the proper times by suitable mechanism 64 which may be the same as described in the Sears application and therefore need not be described in detail. At 61" (Fig. 4) I have indicated part of the mechanism, likewise disclosed fully in said Sears application, for alternately locking and releasing the head 60 for rotation about axis $c$.

I will now describe my improvements which the accompanying drawings illustrate in conjunction with a bottle-making machine of the Sears type.

At the upper portion of the column 50 is located a stationary vertical valve body 65 having two separate axial or longitudinal channels 65', 65" of which the lower one, 65', communicates at its lower end with a chamber 50' formed in a portion of the column 50, and into which leads an air-supply pipe 66, as indicated in Fig. 2. The upper end of this channel is within a preferably conical portion or plug 65* of the said valve body, and connects with an upwardly and outwardly inclined duct 67 leading to a segmental channel 68 (Fig. 17). At 69 and 70 I have indicated means for positioning the valve body 65 and obtaining an air-tight joint. The upper channel 65" is connected at the top with an air-supply pipe 71, the air from this source being of a different, and preferably of a higher pressure, than that admitted through the connection 66. The lower end of channel 65" connects with an outwardly and downwardly inclined duct 72 leading to a segmental channel 73, generally longer than the channel 68. The two channels 68, 73 are in the same plane, so that each of them may register with radial ports 74 in the rotary valve member 75 mounted to turn on the conical portion or plug 65*. The pressure in pipe 66 may be say 7 lbs. per square inch (above atmospheric pressure) that is to say, 22 lbs. per square inch absolute pressure, and the pressure in pipe 71 may be 25 lbs. per square inch above atmospheric pressure (or 40 lbs. per square inch absolute).

There is a port 74 for each of the carriages 58 (that is to say, eight such ports in the example shown), and from each of these ports a flexible or extensible pipe 76 leads to a port 77 in a valve casing 78 secured rigidly to the respective carriage 58 (Figs. 1 and 11 to 16). In a vertical chamber 79 of the casing 78 is mounted to slide up and down a valve 80 provided with a slot or port 81 always in communication with the port 77. A coiled spring 82, surrounding the reduced upper portion or stem of the valve, and bearing against a screw plug 83, pushes the valve downward, to keep the roller 84 at the lower end of the valve rod in contact with the stationary annular cam 85. To keep the valve from turning during its sliding motion, the lower portion of the valve stem is shown provided with a longitudinal slot or groove 80', into which extends the end of a screw 80" (Fig. 16) tapped into the casing 78. This casing has a channel 86 communicating with the slot or port 81 only when the valve 80 is in or near its uppermost position, (Fig. 14) and also a lower channel 87 communicating with the slot or port 81 only when the valve 80 is in or near its lowermost position (Fig. 13), while in an intermediate position of the valve (Fig. 12) both channels 86 and 87 are out of communication with the ports 81, 77. In the position Fig. 12 and in any higher position, the lower channel 87 also communicates, by way of the chamber 79, with a channel 88 leading to the surrounding air. Similarly, a channel 89 also leading to the surrounding air, communicates with the upper channel 86 when the valve 80 is in the position Fig. 12 or in any lower position, the lower and the upper portions of the valve being of reduced diameters so as to be out of contact with the walls of the main valve chamber 79 to which the port 77 and channels 86, 87, 88 and 89 lead. For convenience in manufacture, the channel 87 is drilled through from the left-hand side of the casing 78 (Figs. 12, 13, and 14), and the left-hand end of this channel is normally closed by a plug 78'.

In order to cause the valve ring or sleeve 75 to rotate in unison with the frame or table 51, the following device, illustrated in Fig. 2, may be provided: To the lower face of said valve sleeve 75 is secured, say by suitable screws, a ring gear 91 in mesh with a pinion 92 on a vertical shaft 93 extending through the column 50 and supported in stationary bearings 94, 94'. Vertical play of the sleeve 75 and gear is limited by a washer 90 and nuts 90' screwed on the valve body 65. The lower end of shaft 93 carries a bevel pinion 95 in mesh with a bevel gear 96 on a horizontal shaft 97 journaled in suitable stationary bearings (not shown). This shaft 97 also carries a gear 98 engaging the crown gear 54 carried by the table or frame 51. It will be seen that any rotation of the frame 51 is communicated by means of gears 54, 98, shaft 97, pinions 96, 95, shaft 93, pinion 92 and gear 91, to the valve sleeve 75, and the arrangement and gear ratio of the several meshing wheels is such that the sleeve 75 will revolve about the axis $a$ at the same rate of speed as the frame 51.

To each carriage 58 is secured a bracket 99 (Figs. 5 to 10) having a vertical guideway along which is mounted to move a slide 100. Into the upper end of said slide are tapped two screws 101 extending loosely through a head 102 having an upwardly-extending fork 102' between the members of which is located one end of a lever 103, pivotally connected with said fork at 103', and fulcrumed on the carriage 58 at 103". From the central portion of the head 102 a pin 104, rigidly secured to said head, extends loosely into a suitable recess of the slide 100, said pin having a screw-thread to receive a nut and a check-nut indicated at 105. A spring 106, coiled around the pin 104, bears against the nut 105 and against a collar 107 engaging the slide 100, said spring thus tending to separate the head 102 from the slide and to press said head against the heads of the screws 101, and providing a certain amount of looseness in this connection between the lever 103 and the slide 100. This lever is provided at its inner end with a roller 108 engaging stationary cams to cause the slide 100 to move up or down at the proper times as set forth hereinafter.

The slide 100 is provided with a horizontal guide 100' (Figs. 8 and 9) extending inwardly and outwardly, and along this horizontal guide (parallel to the axis $c$ of the head 60) is movable another slide 109, coiled springs 110 tending to project said slide 109 to the position shown in Figs. 5 and 7, in which said slide abuts against a cross bar 100" of the slide 100. The slide 109 is provided with a funnel-shaped passage 109', into the upper end of which projects a funnel 109" spaced from the walls of said passage to leave a narrow annular chamber or channel 109*. The funnel 109" is rigid with the slide 109, being secured, for instance, by means of screws 109$^a$ (Fig. 7). The funnel 109" and passage 109' serve for the introduction of the molten glass into the inverted blank mold, as will be described below. Fig. 5 illustrates the filling position, in which the upper end of the funnel 109" is open, and the lower end of the passage 109' communicates with the upper end of the inverted blank mold 62. The slide 109 is also provided with a projection 109$^b$ having an oblique edge adapted to engage a suitable stationary cam, as hereinafter referred to, so as to move the slide 109 inwardly against the tension of the springs 110. When in its inner position, the slide 109 is adapted to be locked temporarily by the engagement of a hook 111 with a notch 112' on a catch 112 secured rigidly to the slide 100. Preferably the catch 112 is adjustable lengthwise of the guide 100', as by means of nuts 113 screwing on the sliding stem of said catch and accessibly located in an opening or recess 100* of the slide 100, said nuts, after adjustment, engaging the opposite walls of said opening. The hook 111 is secured to, or made integral with, an arm 114 pivoted to the slide 109 about an axis 115 transverse to the path of said slide along the guide 100'. With the free end of the arm 114 is connected pivotally a pin 116 sliding vertically in a suitable opening of the slide 109 and normally pressed upward by a coiled spring 117.

Above the slide 109 a cover 118 is mounted to move above the cross bar 100" and along a guide 100$^a$ of the slide 100, the path of the cover 118 being parallel to that of the slide 109. The outer end of the cover 118 is preferably made with a curved recess 118' to expose fully the upper end of the funnel 109" when the cover is retracted (Fig. 5) against the stop wall 100$^b$. The lower surface of the cover 118 is adapted to hold the pin 116 down as in Fig. 5 to keep the hook 111 below the level of the catch 112, and the outer (right-hand) edge of the head of said pin is beveled as shown, so that when the cover 118 is retracted (toward the left), its inner (left-hand) edge will engage the beveled surface of the pin 116 and depress the latter to release the slide 109, which is then thrown outward (to the right) by the springs 110. To operate the sliding cover 118, I provide a lever 119, fulcrumed on the slide 100 at 120, and having one end pivotally connected at 121 with the cover 118, while the other end of said lever carries a roller 122 adapted to be engaged and swung by a stationary cam referred to hereinafter. The lever 119 moves in a horizontal plane, the connections at 120, 121 having vertical axes.

Each channel 87 communicates with an angular duct 87' (Figs. 11 and 12), from which a pipe 123, including a flexible portion 123' leads to a pipe 124 (Fig. 9) rigidly secured to the slide 109 at the chamber or channel 109*, as by screwing said pipe into a port communicating with said chamber or channel. The slide 100 is provided with a horizontal slot 100$^c$ (Fig. 4) in which the pipe 124 travels as the slide 109 moves relatively to the slide 100. Preferably, as shown, the upper part of the chamber or channel 109* is considerably wider than its lower part or discharge orifice, so that the air passing from the outlet of the pipe 124 into said upper part of the chamber 109* may become distributed readily around said chamber and issue in a uniform jet from the annular orifice or port at the bottom of the funnel 109". A guide loop 125 (Fig. 7) may be secured to the slide 100 to support the pipe 123, said pipe being in sliding engagement with said guide.

From each channel 86 piping 126 leads to the invertible head 60 (Fig. 2), it being understood that said piping is stationary with respect to the carriage 58 and to the casing 78. The delivery end of this piping terminates in line with the axis $c$ about which the head 60 turns. In its general features, this head with the blank mold 62 and neck mold 63 carried thereby, is very similar to the construction shown in the Sears application referred to above, hence a detailed description will not be necessary. The head 60 is made integral or at least rigid with a shaft 60' journaled in the carriage 58 and provided with a channel 60" the admission end of which is in line with the axis $c$, and suitable packings, as 127, are provided to produce a tight joint between the non-rotary pipe 126 and the said shaft 60'. The delivery end of the channel 60" is connected by a pipe 128 with a port 129' leading to an annular chamber 129" formed in a sleeve 129. This sleeve is fitted tightly within another sleeve 130, secured rigidly, as by a pin 131, to a boss or housing 60* projected from the head 60, the parts 60*, 129, and 130 being normally rigid with the head 60, as are also a sleeve 132 contained within the sleeve 129, a head or gland 133 screwed into the outer end of the sleeve 129 to press the sleeve 132 into position against a shoulder of said sleeve 129, and a cap 134 adapted to compress packing 135 against a plunger 136 movable axially in the inner sleeve 132. The plunger has a sliding fit in said sleeve at both sides of an annular chamber 132' which communicates with the chamber 129" by means of a duct 132". At the end opposite the gland 133, the sleeve 132 is formed with a contracted orifice 132* of cylindrical shape into which the similarly shaped reduced portion 136' of the plunger is adapted to fit in a glass-tight manner in one position of the plunger (Fig. 18). Adjacent to the contracted end 132*, the sleeve 132 is made with an enlargement forming an annular chamber 132$^a$, and between said chamber 132$^a$ and the chamber 132', the sleeve is formed with longitudinal grooves 132$^b$ affording a permanent communication between said chambers, the ribs between said grooves (see Fig. 20) being in guiding contact with the said reduced portion 136' of the plunger. At its free end, the reduced portion 136' is formed with a tapered or conical tip 136". The free end of the sleeve 132 is made with an annular concave groove to assist in shaping the end surface of the bottle neck, as indicated in Figs. 18 and 19. The outer end of the plunger 136 carries rigidly a cap 137 (which may be screwed to said end) provided with openings for aligning pins 138 by means of which said cap is connected pivotally with links 139 secured at their other ends rigidly to aligning pins 140 and sleeves 141 the axes of which are parallel to that of the pins 138. Preferably the links 139 are formed with longitudinal slots 139' to permit the links and the plunger, with the pins 138, to be adjusted toward and from the pins 140, the nuts 142 serving to lock these parts after such adjustment. The sleeves 141 are journaled in the members of a forked lever 143, having an elongated slot 143' fitted on a horizontal fulcrum pin 144 carried by the invertible head 60 (Fig. 4). At its free end the lever carries a roller 145 adapted to engage, at proper times, two stationary cams 146 and 146' respectively (Fig. 1), one of which will swing the lever 143 in one direction, to advance the plunger 136 to the position Fig. 18, while the other cam will swing the lever in the opposite direction to retract the plunger to the position Fig. 19. To prevent any accidental swinging of the lever 143 on its fulcrum 144, and therefore, any accidental longitudinal shifting of the plunger 136, I may provide the following device, shown in Figs. 4 and 22: A pin 147, secured rigidly to the head 60 and extending parallel to the plane in which said lever swings (that is to say, the axis of said pin intersects the axis $c$ of the head 60), is provided with two notches 147' adapted to be engaged by a pointed latch 148 pressed toward said pin by a spring 149 and slidable toward and from the pin 147 in a transverse guideway provided in a sleeve 150 mounted to slide lengthwise on the pin 147. A screw 151 engaging the outer end of the spring 149 forms an abutment for said spring and at the same time enables its tension to be adjusted. The movement of the sleeve 150 toward the free end of the pin 147 may be limited by the head 147'' of said pin. The sleeve is provided with two aligning sockets in which are journaled the adjacent ends of pivot pins 152 secured rigidly (as by screwing) to the forked portion of the lever 143, said forked portion straddling the sleeve 150 and the pin 147 as shown. This arrangement also keeps the sleeve 150 against turning on the pin 147 and insures the proper registry of the latch 148 with the notches 147'.

The cam 85, shown in developed view in Fig. 25, has portions at different levels to govern the position of the valve 80. The horizontal portions 85', 85'' and 85* are at what may be called the "neutral" level, that is to say, they correspond to the neutral position of the valve 80 (Fig. 12), while the portion 85ᵃ, at a lower level, corresponds to the lowered (open) position of the valve 80 (Fig. 13), and the two portions 85ᵇ, 85ᶜ, both at the same higher level, correspond to the raised (open) position of the said valve (Fig. 14). The cam is preferably made in sections, as shown, for convenience in manufacture.

Fig. 24 is a developed view of the cam 154 which engages the roller 108 on the lever 103, to move the slide 100 (and the parts carried thereby) up or down in the manner described below in connection with the operation of the machine. This cam 153 is preferably also made in sections, as shown. The cam portions 153', 153'', and 153* are at such a level as to push the roller 108 up and thus hold the slide 100 in its lower position, while the cam portion 153ᵃ is adapted to force the roller 108 down and thus hold the slide 100 in the raised position (Fig. 4), and the cam portions 153ᵇ and 153ᶜ are adapted to depress the roller 108 to a much slighter extent, for a purpose to be seated hereinafter. In each of the cams 85 and 153, I prefer to provide inclined or curved surfaces at the ends of the active horizontal cam portions, enumerated above, including the portions 153ᵇ and 153ᶜ. Structurally, portions of the cam 85 may be integral with portions of the cam 153, see Figs. 26, 27, and 28, but this is not essential.

The slide 109 is operated in one direction by the engagement of its projection 109ᵇ with a stationary cam or roller 154, (that is to say, a roller journaled in stationary bearings), while the movement of said slide in the opposite direction is effected by the springs 110 Figs. 1, 5, 6 and 7.

The roller 122 on the lever 119 (for operating the cover 118) is adapted to be operated in one direction by a stationary cam 155 (Fig. 1), and in the other direction by a cam 156 (Figs. 1 and 29) which is normally stationary, but may yield under an abnormal strain. For this purpose, the cam 156 may slide in a stationary guide 157 against the tension of a strong spring 158, the other end of which bears against a plate or bar 159 which is likewise stationary. Normally, the spring 158 keeps the cam 156 against a shoulder on the bottom plate 157' of the guide 157.

The operation takes place as follows: The frame 51 rotates continuously, at a uniform rate of speed, about the axis $a$, thus causing the several carriages 58 and the parts connected therewith, to travel along the tracks 56, 57 (contra-clockwise in Fig. 1). At the time they reach the point A, the slide 100 together with the slide 109 and cover 118 are in their upper position (Fig. 4, so far as these parts are concerned), the position of the cover 118 relatively to the slide 109 and the position of the latter relatively to the slide 100 being as in Fig. 6, that is to say, the hook 111 is in locking engagement with the catch 112, and holds the slide 109 in its retracted position. The invertible head 60 at that time is in its upright position, that is to say, with the neck mold 63 above the blank mold 62, both of these molds being open. At the point A the stationary cam 155 engaging the roller 122 (see dotted position, Fig. 1) swings the lever 119 on its fulcrum 120 in such a way as to carry the cover 118 toward the bracket 99. This movement will draw the inner edge of the cover 118 over the beveled or oblique surface on the upper end of the pin 116 and will thus depress said pin against the tension of the spring 117, to throw the hook 111 away from the catch 112. As soon the hook is disengaged, the springs 110 will throw the slide 109 outwardly, that is to say, away from the bracket 99 to the position (relatively to slide 100) shown in Fig. 5, the pin 116 being kept down by its engagement with the lower surface of the cover 118. The cross bar 100'' limits this outward movement of the slide 109 and arrests the latter in a position in which its funnel 109'' and passage 109' have their axis coincident with the axis $d$ of the neck mold and blank mold.

Thereupon, say at the point B, the head 60 is brought to the inverted position (that is to say, neck mold 63 below the blank mold 62), by suitable mechanism, such as the one described in the Sears application above referred to, which Sears mechanism is so constructed that the aforesaid inversion of the head 60 also causes a closing of the neck mold and of the blank mold, the neck mold sections during this closing movement coming in contact with the outer surface of the sleeve 132 at the end thereof, see Figs. 18 and 19. At or about this time, the cam 146 will operate on the lever 143 to bring the plunger 136 from the position indicated in Fig. 19 to that shown in Fig. 18, so that said plunger will have a glass-tight fit at the discharge opening of the sleeve 132. When the head 60 is fully inverted, the axis $d$ of the closed blank mold and neck mold is again in line with the center or axis of the funnel 109'' and passage 109'.

At the point C, the incline preceding the cam portion 153' causes the lever 103 to swing on its fulcrum 103'', thus carrying the slide 100 down and bringing the slide 109 tightly against the blank mold 62 at the end surface thereof. The blank mold is provided with converging inclined surfaces 62' the longitudinal straight-line elements of which are, in this position of the mold, parallel to the path of the slide 109. The vertically-moving slide 100 has downwardly-diverging inclined surfaces $100^d$ corresponding to the surfaces 62' and therefore also extending lengthwise of the path of the slide 109; it is not necessary, however, that the inclined surfaces 62' and $100^d$ should have longitudinal straight-line elements parallel to the path of the slide 109. The co-operation of the inclined surfaces 62' with the surfaces $100^d$ of the descending slide 100 will not only insure a proper position of said slide relatively to the blank mold, but will also hold the upper ends of the blank mold sections together tightly. Should any obstruction (say, adhering glass) prevent the slide 100 from having its full downward movement, there would be danger of injury (breakage) to some of the parts between the roller 108 and the slide 100, since the cam 153 will always operate said roller in the same way. The spring 106 would however, in such a case, enable the lever 103 to be given its full throw notwithstanding the fact that the slide 100 might stop before reaching the normal end of its downward stroke. The lever 103 is kept, by the horizontal cam portion 153', in a position maintaining the slides 100 and 109 positively against the blank mold 62. The cover 118 has a slight up-and-down play relatively to the slide 100, and the slide 109 has a similar vertical play relatively to said slide 100, as indicated, in exaggerated fashion, by the double lines in Fig. 9. Thus, when the slide 100 moves downwardly, the slide 109 will be the first to engage the blank mold 62, or rather to be stopped by said blank mold, the downward movement of the cover 118 being stopped at practically the same moment as that of the slide 109. The slide 100 is however capable of a very slight additional downward movement after the downward movement of the slide 109 and of the cover 118 has ceased, and this slight relative movement of the slide 100 will press the cover 118 very tightly upon the upper end of the slide 109, and the latter upon the upper end of the blank mold 62, so that tight joints will be insured at both places. The parts are now in the position indicated in Fig. 5, and remain in this position until after the filling operation.

As the carriage 58 reaches the dwell portion of the track 56, 57, the mold axis $d$ as stated takes a position in line with the axis $b$, and remains in this position while the carriage travels on said dwell portion, the carriage virtually swinging about the stationary axis $b$. During this swinging movement (say along the track portion D), the charge or parison of molten glass is introduced from above in any suitable manner through the funnel 109'' and the passage 109' of the slide 109 into the blank mold 62 and the neck mold 63, the lower end of the latter being at this time closed by the sleeve 132 and the plunger 136, Fig. 18. The sliding cover 118, being retracted as shown in Fig. 5, exposes the upper end of said funnel 109''.

After the parison has thus been deposited in the blank mold and neck mold, and preferably while the carriage 58 is still traveling along the dwell portion of the track (say, at the point E), the lever 119 is swung by the cam 156 in such a direction as to move the cover 118 outwardly over the funnel 109''. Inasmuch as the downward pressure of slide 100 against cover 118 will prevent the latter from sliding, the downward pressure of the slide 100 is relieved for a moment at the time the cover is to be moved by the lever 119. For this purpose, the roller 108 will at this time engage the cam portion $153^b$ which will throw said roller and the adjacent end of the lever 103 slightly downward, to give a corresponding slight lift to the slide 100, thus relieving the pressure on the cover 118, and freeing it for its horizontal sliding movement, under the action of the cam 156 on the lever 119. As soon as the cover 118 has reached the outer position, sealing the upper end of the funnel 109'' (Figs. 7 and 9), the cam portion 153'' causes the lever 103 to resume its former position, thus exerting pressure, by means of the slide 100, to hold the cover 118 tightly against the funnel 109'' of the slide 109 so as to efficiently seal the upper end of said funnel, while at the same time the slide 109 is pressed tightly against the blank mold 62, as before. As the cam 156 might still be in engagement with the roller 122 at the time the cover 118 is thus locked again against sliding movement in a horizontal direction, there might be danger of injury to the lever or to the cam, and to avoid this the spring 158 (Fig. 29) has been provided, which will allow the cam to yield under conditions that would otherwise endanger the parts.

After the cover 118 has thus been brought to the sealing position (Figs. 7 and 9), the valve 80, which so far (from before A to E) has been in the neutral position, Fig. 12, owing to the engagement of the roller 84 with the cam portion 85', is shifted to the lower position, Fig. 13, by the engagement of said roller 84 with the cam portion 85ª. At this time, the rotary valve member 75 is in such a position that its port 74 corresponding to the particular head or carriage under discussion, is in registry and communication with the stationary segmental channel 73. Air (preferably of comparatively high pressure) will then pass from pipe 71 through channel 65'' and duct 72 to said segmental channel 73, port 74, the corresponding pipe 76, port 77, valve port 81, channel 87, pipes 123, 123' and 124, and chamber or channel 109* of the saddle 109. This air will issue in a thin annular jet between the lower end of the funnel 109'' and the adjacent wall of the passage 109', and will perform two important functions: First, it will blow away from the walls of said passage, particularly at the contracted portion thereof, any glass that may adhere to said walls, and will insure the transfer of such glass into the blank mold below, the blast, being continuous around the entire circumference of the passage, will force any adhering glass off the walls of the passage, at any part of its circumference. Second, the downward pressure of the air issuing from the chamber or channel 109* will press the parison downward within the blank mold and neck mold, thus molding the parison to the neck mold and to the plunger end as well as against the annularly grooved end surface of the sleeve 132. This compression of the parison by the downward blast of air takes place along the portion F of the carriage path. The lower surface of the cover 118 is smooth, so as to properly seal the funnel 109'' in the outward position of the cover, without requiring this outer position to be accurately defined; that is to say, the cover does not need to stop at exactly the same point of its outward travel in order to seal the funnel 109'' properly.

This blowing period, along the portion F of the carriage path, is brought to its end by the action of the incline following the cam portion 85ª on the roller 84 of the valve 80. Said valve is thus shifted from the position Fig. 13 to the neutral position Fig. 12, thereby stopping the admission of air to the slide 109 and to the blank mold. The valve 80 remains in this neutral position while the roller 84 is engaged by the cam portion 85''.

Thereupon, say at the point G, the cam portion 153ᶜ will exert an action similar to that described with reference to the cam portion 153ᵇ, that is to say, the slide 100 will for a moment be raised very slightly to relieve the downward pressure on the slide 109 (and on the cover 118), freeing said slide for its inward movement which is about to take place. Such inward movement is brought about by the engagement of the projection 109ᵇ on said slide, with the roller 154 (journaled about a stationary axis), which forces the slide inward, against the tension of the springs 110. At the end of this inward movement, the hook 111 will be engaged by the catch 112, thus locking the slide 109 in the position nearest the bracket 99. Immediately thereafter, the cam portion 153* will cause the slide 100 to again press the slide 109 tightly down on the blank mold 62. In this position, illustrated by Fig. 6, a concave bottom-forming recess 109ᶜ of the slide 109 registers with the cavity or chamber of the blank mold at its upper end.

At about the same time, the plunger 136 is (by the action of the cam 146') retracted from the position Fig. 18 to the position Fig. 19, in which the upper end of the plunger leaves an annular opening at the upper end of the sleeve 132, through which opening the chambers 132ª, 132', and 129'' will communicate with the recess in the parison, formed by the tip of plunger 136. The tapering shape of this tip facilitates its withdrawal from the parison. The pressure of the cam against the roller 145 is sufficient to lift or force the latch 148 from the recess 147' with which it is engaged at that time, owing to the wedge-shape of said latch and of the recesses or notches 147'. Still, the action of spring 149 keeps the latch 148 in the notch 147' with sufficient force to prevent any accidental movement of the lever 143. The slots 139' (Fig. 21) permit of accurately adjusting the normal position of the plunger 136.

After the plunger 136 has thus been shifted to the position Fig. 19, and practically at the same time, the incline of cam 85 following the cam portion 85'', shifts the valve 80 from the neutral position Fig. 12 to the raised or upper position, Fig. 14. While the valve 80 is thus held open by the cam portion 85ᵇ (along the portion H of the carriage path), the port 74 of that particular carriage being still in registry with the stationary segmental channel 73, air (preferably at a relatively high pressure) will pass from the pipe 71 through channel 65'' and duct 72 to said segmental channel 73, port 74, the corresponding pipe 76, port 77, valve port 81, channel 86, piping 126, channel 60'', pipe 128, port 129', chamber 129'', duct 132'', chamber 132', grooves 132ᵇ, chamber 132ª, and, through the annular space between the inner wall of the sleeve outlet and the tip 136'' of the plunger 136, into the parison cavity from which said plunger tip has been withdrawn. The parison is thus distended within the blank mold 62 (it being understood that no glass has remained in the passage 109' of the slide 109), and the upper portion of the parison is pressed into the bottom-forming recess 109ᶜ, thus shaping that surface of the parison which subsequently becomes the outer surface of the bottle bottom. At the end of this blowing period (corresponding to the portion H of the carriage path), the roller 84 comes down the incline following the cam portion 85$^b$, and the valve 80 returns to the neutral position Fig. 12, and remains in this position while the roller 84 travels along the cam portion 85*. Shortly after this, say at the point I, the incline following the cam portion 153* forces the roller 108 down and lifts the slide 100 and all parts connected therewith, into the position indicated in Fig. 4 (in which, for the sake of clearness, the parison is not shown).

Then follows another inversion of the head 60 (half-revolution about the horizontal axis c) to bring the neck mold 63 above the blank mold 62; then the blank mold opens, leaving the parison suspended from the neck mold; then the blow mold, in open condition, rises adjacent to the parison and is closed upon the lower portion thereof (no part of the blow mold rising above any part of the neck mold). This brings the parison into position for the final blowing operation. All the movements described in this paragraph may be performed by mechanism such as set forth in the aforesaid Sears application, so that detailed description thereof will not be required.

The final blowing by which the parison is converted into a finished bottle, takes place along the portion K of the carriage track, the second inversion of the head 60 having taken place before, say at J. This final blowing occurs while the port 74 corresponding to the particular carriage under discussion, is in registry with the segmental channel 68 of the stationary valve body 65. The incline following the cam portion 85* causes the roller 84 to rise with the valve body 80, bringing the latter to the position shown in Fig. 14. Air will then pass from the pipe 66 (preferably supplying air at a comparatively low pressure, as stated hereinbefore) to the chamber 50', the ducts 65 and 67, segmental channel 68, port 74, pipe 76, port 77, valve port 81, channel 86, piping 126, channel 60'', pipe 128, port 129', chamber 129'', duct 132'', chamber 132', grooves 132$^b$, chamber 132$^a$ and, through the annular outlet at the upper end of sleeve 132, into the partly-formed cavity produced in the parison by the preceding preliminary, bottom-forming operation. As the roller 84 reaches the incline following the cam portion 85$^c$, and descends to the cam portion 85', the valve 80 is brought back to the neutral or closed position (Fig. 12), thus terminating the final blowing operation.

Then follow operations of the character set forth in detail in the Sears application, and it will therefore be sufficient to point them out in a general way, without attempting to describe the instrumentalities employed for this purpose: The neck mold opens, the blow mold descends (at any point between K and B), then (preferably after a sufficient interval to allow the bottle to cool to some extent) the blow mold 55 opens, and finally the bottle is removed. This opening of the blow mold 55 and the removal of the bottle may take place, for instance, at some point of the track portion H, in which case the complete series of operations performed on the same body of glass will extend over somewhat more than one complete revolution of the machine.

It will be understood that the bottom-forming recess 109$^c$ of the slide 109 does not give the bottom of the parison the final shape of the bottle bottom, which final shape is imparted to it in the blow-mold 55.

The channels 88, 89 provide vents into the surrounding air, from the chamber 79 as the valve 80 moves up or down, and thus prevent or relieve the resistance which a body of trapped air would oppose to the movement of said valve.

Various modifications may be made without departing from the nature of my invention as set forth in the appended claims.

I claim as my invention:

1. In a machine of the class described, a stationary track, a carriage arranged to travel along said track, an invertible mold mounted on said carriage, blowing mechanism located above said mold and likewise mounted on the carriage so as to travel therewith at all times, means for bringing said mold and blowing mechanism into and out of operative relation, means for operating said blowing mechanism while it is in said relation to the mold, and another blowing mechanism arranged to co-operate with said mold when the latter is inverted with respect to the position it occupies when in operative relation to the first-named blowing mechanism.

2. In a machine of the class described, a stationary track, a carriage arranged to travel along said track, an invertible head mounted on said carriage movably, a mold and a blowing mechanism for said mold, both carried by said invertible head, another blowing mechanism mounted on said carriage independently of said head, and means for establishing a co-operative relation between the mold and the last-named blowing mechanism at a time when the mold is inverted with respect to the position in which the first-named blowing mechanism is operated.

3. In a machine of the class described, a traveling carriage, a mold mounted on said carriage, a member likewise mounted on the carriage but movable relatively to the mold, said member being provided with a through passage adapted to register with the mold in one position for the introduction of a charge of material, and also provided with a recess adapted to register with one end of the mold in the other position of said member, and blowing mechanism arranged to co-operate with the other end of said mold when the mold is in registry with said recess.

4. In a machine of the class described, a stationary track, a carriage arranged to travel along said track, a mold mounted on said carriage, a slide movable on said carriage up and down above said mold, another slide movable on the first-named slide horizontally and provided with a through passage adapted to register with the mold in one position for the introduction of a charge of material, and also provided with a recess adapted to register with one end of the mold in the other position of said slide, and blowing mechanism arranged to co-operate with the other end of said mold when the latter is in registry with said recess.

5. In a machine of the class described, a stationary track, a carriage arranged to travel along said track, a mold mounted on said carriage, a slide movable on said carriage up and down relatively to and above said mold, a member carried by said slide and provided with a through passage for introducing the charge of material into the mold, a cover movable above said passage to open and close it, and means for blowing through said passage at the time it communicates at one end with the mold and is closed by the cover at the other end.

6. In a machine of the class described, a stationary track, a carriage arranged to travel along said track, a mold mounted on said carriage, a slide movable on said carriage up and down above said mold, a member carried by said slide and provided with a through passage for introducing the charge of material into the mold, a cover movable across said passage to open or close it at a distance from the end communicating with the mold, means for blowing downwardly in said passage at the time the cover is in the closing position and said passage communicates with the mold, to exert a downward pressure on the material in the mold, and means for subsequently blowing into the interior of said charge, from the opposite end of the mold.

7. In a machine of the class described, a stationary track, a carriage arranged to travel along said track, a slide movable up and down on said carriage, an invertible head mounted on said carriage movably below said slide, a mold carried by said head, blowing mechanism, likewise carried by said head, and adapted for co-operative relation to one end of said mold, another slide movable in and out on the first-named slide and provided with a through passage which by such in and out movement is brought into and out of the plane in which the mold swings during its inversion movement, said second-named slide being provided, at a distance from said through passage, with a recess facing the mold and adapted to co-operate with the end of the mold opposite the one which co-operates with the blowing mechanism carried by the head, a cover movable in and out to close or expose that end of the said passage which is farthest from the mold, and a second blowing mechanism connected with said passage.

8. In a machine of the class described, a stationary track, a carriage arranged to travel along said track, an invertible head mounted to turn on said carriage, a mold carried by said head, blowing mechanism, likewise carried by said head, and adapted for co-operative relation to one end of said mold, a slide mounted on the carriage independently of the said head and movable transversely to the axis about which the head turns, another slide mounted on the first-named slide and movable in a direction parallel to said axis, said second slide having a through passage adapted to register with the end of the mold opposite to the one co-operating with said blowing mechanism of the head, a cover adapted to close the outer end of said passage to form a backing for the pressure, or to expose said passage end for the introduction of a charge of material through the passage into the mold, and another blowing mechanism connected with said passage to compress the charge within said mold while the said cover is in the passage-closing position.

9. In a machine of the class described, a stationary track, a carriage movable along said track, an invertible head mounted to turn on said carriage, a mold carried by said head, blowing mechanism, likewise carried by said head and adapted for co-operation with the mold at one end thereof, a slide connected with said carriage, and movable in a direction parallel to the axis about which said head turns, said slide being provided with a through passage adapted to register with the end of the mold opposite to the one first mentioned, while in another position said slide closes such opposite end of the mold, and means for operating said blowing mechanism at a time when said slide is in closing relation to the mold.

10. In combination, a glass-shaping mold, and a blow-head having a passage for guiding a charge to the mold, including means for subsequently sealing the passage and admitting blowing air thereto independently of the sealing means to blow the charge in the mold.

11. In combination, a ware-shaping mold, a combined blow-head and funnel for guiding a charge to the mold, said funnel having an annular inlet passage between its ends, and means for directing air under pressure through said annular passage.

12. In a machine of the class described, a stationary track, a carriage movable along said track, an invertible mold unit including a blank mold and a neck mold mounted to turn on said carriage, blowing mechanism arranged to co-operate with one end of said unit, and mounted to share the inversion movement of said unit, a member mounted on the carriage movably and adapted, in one position, to close the end of the unit opposite to the one first mentioned, and, in another position, to expose said opposite end of the unit for the introduction of the charge, a blow mold adapted to cooperate with said neck mold of the unit when the unit has been inverted to bring said opposite end away from said member, and means for causing said blowing mechanism to operate, first while said member is in the closing position, and subsequently, after the unit has been inverted and its neck mold brought into co-operative relation to said blow-mold.

13. In combination, a ware-shaping mold, a blow-head, including a mold-bottom closing portion and a blowing portion having a passage for guiding a charge to the mold with means for sealing the passage previous to the blowing operation, and means for moving the blow-head to and from blowing and mold-bottom closing positions.

14. In a machine of the class described, a mold, a member arranged adjacent to the mold and provided with a passage through which material may be introduced into said mold, a cover movable to close said passage on the side opposite to the mold, or to clear said passage for the introduction of the charge, and blowing mechanism connected with said passage between the points at which it is engaged by the cover and by the mold respectively.

15. In a machine of the class described, a mold, a movable member arranged adjacent to the mold and provided with a through passage, and also provided with a portion adapted to close one end of the mold, a cover movable to close said passage on the side opposite to the mold, or to clear said passage for the introduction of the charge into the mold, means for effecting relative movement of said member and of the mold to bring them into and out of contacting co-operative relation, blowing mechanism connected with said passage and adapted to co-operate with the mold when said passage is closed by the cover and in registry with one end of the mold, and another blowing mechanism associated with the other end of the mold and adapted to operate when said movable member is in the mold-closing position.

16. In a machine of the class described, a mold, a slide movable toward and from said mold, another slide movable on the first-named slide to close the adjacent end of the mold, in one position, and, in another position, to expose said mold end for the introduction of the charge, blowing mechanism co-operating with the other end of the mold, elastic means tending to throw said second slide into the position in which it exposes said end of the mold, means for latching the said second slide in the other position, and means for releasing the latching means.

17. In a machine of the class described, a mold, a member located adjacent thereto, a slide movable on said member adjacent to the mold and adapted to engage the latter at one end, means for effecting relative movement of said member and the mold to carry said slide into and out of engagement with the mold, said slide, in one position, being adapted to close said end of the mold, and, in another position, to clear said end for the introduction of a charge, means tending to throw said slide into the position in which it clears said mold end, blowing mechanism co-operating with the other end of the mold, a device for latching said slide in the other position, and means for releasing said latching device.

18. In a machine of the class described, a mold, a member located adjacent thereto, a slide movable on said member adjacent to the mold and adapted to engage the latter at one end, means for effecting relative movement of said member and the mold to cause said slide to come into and out of engagement with the mold, said slide having a thorough passage, which, in one position, registers with said end of the mold, while, in another position, an imperforate portion of the slide is adapted to close said mold end, blowing mechanism co-operating with the other end of the mold, means tending to throw the slide into the position in which its passage registers with the mold, a device for latching the slide in its other position, another blowing mechanism connected with said passage, and a cover co-operating with said latching device and adapted, in one position, to close said passage on the side opposite to the mold.

19. In a machine of the class described, a mold, a slide movable toward and from the mold lengthwise of the mold axis, another slide movable on the first-named slide transversely of the mold axis to close the adjacent end of the mold, in one position, and, in another position, to clear said end for the introduction of the charge, means for effecting relative movement of the mold and the first-named slide to carry the second slide into and out of engagement with the mold, said means including an elastic or yielding connection transmitting motion from one element of said means to another to prevent breakage of parts in the event of an obstruction's preventing full movement of the second slide toward the mold, and blowing mechanism co-operating with the other end of the mold.

20. In a machine of the class described, a mold, a member located adjacent thereto, a slide movable on said member adjacent to the mold and adapted, in one position, to close one end of the mold, and, in another position, to clear said end for the introduction of a charge, means for effecting relative movement of the mold and of said member to cause said slide to come into and out of engagement with the mold, said means including a yielding connection transmitting motion from one element of said means to another to prevent injury to the parts in the event of an obstruction's preventing said relative movement from reaching its full extent, and blowing mechanism co-operating with the other end of the mold.

21. In a machine of the class described, a mold, a member located adjacent thereto, a slide movable on said member adjacent to the mold and adapted, in one position, to close one end of the mold, and, in another position, to clear said end for the introduction of a charge, means for effecting relative movement of said mold and member to cause the mold and slide to come into and out of engagement, and to exert pressure to insure a tight joint between the mold and said slide while they are in engagement, means for operating said slide, means for temporarily relieving said pressure to allow the slide to be moved, and blowing mechanism co-operating with the other end of the mold at the time said slide is in the mold-closing position.

22. In a machine of the class described, a mold, a member arranged adjacent to the mold, a slide movable on said member adjacent to the mold and adapted, in one position, to close one end of the mold, said slide having a through passage which, in another position of the slide, registers with the said end of the mold, means for effecting a relative movement of said mold and member to cause the mold and slide to come into and out of engagement, a cover movable on said member on the side of the slide opposite to the mold, and adapted, in one position, to clear said passage for the introduction of the charge into the mold, and, in another position, said relative movement, when taking place in one direction, operating to press the cover tightly against the slide, and the latter tightly against the mold, blowing mechanism connected with said passage, between the cover and the mold, another blowing mechanism co-operating with the opposite end of the mold, and means for temporarily relieving the pressure which insures tight engagement of the slide with the cover and with the mold, to free said cover and slide for changing their positions.

23. In a machine of the class described, a mold, means for closing one end of said mold, a member movable adjacent to the other end of the mold and adapted for engagement therewith, said member being provided with a through passage and with a funnel one end of which is connected with said member while the other end of the funnel is spaced from the wall of the passage to form an annular chamber and an annular outlet, blowing mechanism connected with said chamber, and means for closing, at times, the end of said funnel distant from said annular outlet.

24. In a machine of the class described, a mold, a charging funnel therefor, means for pressing the mold and funnel toward each other, a cover for closing the end of the funnel distant from the mold, said funnel having an opening in its side and blowing mechanism connected with said funnel opening.

25. In a machine of the class described, a mold, a member located adjacent to said mold and provided with a charging passage, means for effecting relative movement of said mold and member to secure their tight engagement, means for closing at times, that end of said passage which is distant from the mold, and blowing mechanism having a part permanently connected with said passage.

26. In a machine of the class described, a traveling carrier, a mold thereon, blowing mechanisms arranged to co-operate with opposite ends of the mold, a source of fluid-pressure, and a valve located on said carrier to travel therewith and controlling the connection of said source with one or the other of said mechanisms.

27. In a machine of the class described, a traveling carrier, a mold thereon, blowing mechanisms arranged to co-operate with opposite ends of the mold, two sources for supplying fluid under different pressures, a valve located on the carrier to travel therewith and controlling the flow of fluid to one or the other of said mechanisms, and another valve controlling the connection of the first-named valve with one or the other of said sources of fluid-pressure.

28. In a machine of the class described, a mold, a sleeve located adjacent to said mold and provided with an orifice adapted to communicate with the mold, said sleeve also having a chamber adjacent to said orifice, another chamber at a distance from the first-named chamber, a longitudinally grooved portion connecting the two chambers, means for supplying a medium under pressure to the second-named chamber, and a plunger extending through said chambers and orifice and adjacent to said grooves and the end of said plunger being smaller than said orifice and adapted to be advanced or retracted through said orifice.

29. In a machine of the class described, a carrier, an invertible mold mounted on said carrier movably, a blowing mechanism adapted for co-operation with one end of the mold and arranged to share the inversion movement of the mold, another blowing mechanism mounted on said carrier independently of the invertible mold so as not to share the inversion movement of the mold, and valve mechanism mounted on said carrier and controlling the supply of a medium under pressure to both blowing mechanisms.

30. In a machine of the class described, a carrier, an invertible head mounted on said carrier movably, blowing mechanism adapted for co-operation with one end of said mold, and arranged to share the inversion movement of the mold, a member adapted to close the other end of the mold when said mold is in one of its positions, and to bring a filling passage into registry with said mold while the latter is in the same position, another blowing mechanism connected with said filling passage, means for closing the filling passage temporarily on the side opposite to the mold connection, and valve mechanism mounted on said carrier and arranged to control the supply of a medium under pressure to both of said blowing mechanisms.

31. In a machine of the class described, a stationary track and a stationary valve body connected with a supply of a fluid medium under pressure, a carriage movable along said track and a movable valve member arranged to follow the carriage in its travel and co-operating with said valve body to open or shut off the passage of said medium under pressure to or from said valve member, an invertible mold on said carriage, a blowing mechanism co-operating with one end of said invertible mold, another blowing mechanism co-operating with the other end of said mold, and valve mechanism mounted on the carriage and interposed in the connection from said movable valve member to the blowing mechanisms, whereby the pressure medium may be directed from said valve member to one or the other of said blowing mechanisms.

32. In a machine of the class described, a stationary track and a stationary valve body having two independent channels for the supply of a medium under pressure, a carriage movable along said track and a movable valve member arranged to follow the carriage in its travel, and having a port adapted to register successively with each of said channels, an invertible mold on said carriage, blowing mechanism adapted to co-operate with one end of said mold and to follow said mold in its inversion movement, another blowing mechanism mounted on the carriage independently of said invertible mold and adapted for co-operation with the other end of the mold, and valve mechanism mounted on the carriage and having on one side a connection to said port of the movable valve member, and on the other side separate connections to the two blowing mechanisms, with means whereby said valve member connection may be brought into communication with one or the other of said blowing mechanism connections, whereby the medium under pressure may be supplied to said blowing mechanisms successively, and whereby further one of said blowing mechanisms may be supplied successively with fluid medium of different pressures.

33. In a machine of the class described, a stationary track having a portion at which its direction changes abruptly, a carriage arranged to travel along said track, blowing mechanism on said carriage, a member movably mounted on the carriage and co-operating with said blowing mechanism, and an operating cam for said member, located adjacent to said track portion and yielding in a direction transverse to the carriage path.

34. In a machine of the class described, a stationary track having a major portion of circular curvature, and a minor re-entrant portion curved in the arc of a circle the center of which lies exteriorly of said major track portion, a carriage arranged to travel along said track, mechanism mounted on said carriage and having operating portions traveling with the carriage, and an actuating cam for one of said operating portions, located adjacent to one of the junctions of the minor track portion with the major track portion, and yielding in a direction transverse to the carriage path.

35. In a machine for forming articles of glass, the combination of a movable support, a mold mounted on said support, forming means associated with the lower end of said mold, and a gather receiving funnel and a closing member both carried by said movable support and adapted to be alternately presented to the upper end of said mold, the operation of said funnel and said member being actuated by the movement of said support.

36. In a machine for forming articles of glass, the combination of a movable support, a mold mounted on said support, forming means associated with the lower end of said mold, a movable element mounted on said movable support above said mold and provided with a gather receiving funnel and a mold closing member, and means actuated by the movement of said support for alternately presenting said funnel and said member to the upper end of said mold.

37. In a machine for forming articles of glass, the combination of a movable support, a plurality of molds mounted on said support, forming means associated with the lower end of said molds, a plurality of movable cover members mounted on said movable support, one of said cover members being associated with each of said molds, means carried with each cover member for guiding charges of glass into the arrested mold, and means whereby the movement of said support positions each of said cover members in turn over its associated mold to close the upper end of the latter for the forming operation.

38. In a machine for forming articles of glass, the combination of a movable support, a plurality of molds mounted on said support, forming means associated with the lower ends of said molds, a plurality of movable members mounted on said movable support, one of said members being associated with each of said molds and each of said members being provided with a funnel for directing the gather of glass into its associated mold and a closure for the upper end of said mold, and means actuated by the movement of said support for shifting said members whereby during the feeding operation the funnel is positioned over said mold and during the forming operation said closure closes the upper end of said mold.

39. In a machine for forming articles of glass, the combination of a movable support, a plurality of molds mounted on said support, forming means associated with the lower ends of said molds, a plurality of movable members mounted on said movable support, one of said members being associated with each of said molds and each of said members being provided with a funnel for directing the gather of glass into its associated mold and a closure for the upper end of said mold, and means actuated by the movement of said support for shifting said members whereby during the feeding operation said funnel is positioned above and depressed into engagement with said mold and during the forming operation said closure is positioned above and depressed into engagement with said mold.

40. In a machine for forming articles of glass, the combination of a mold, blowing mechanism adapted to be brought into operative relation with said mold, a cap carried by said blowing mechanism and adapted to fit the mold to admit blowing pressure thereto, said cap being loosely mounted in said blowing mechanism to enable it to accommodate itself to the mold, and resilient means carried by said blowing mechanism for compressing said cap against the mold.

41. In a machine for forming articles of glass, the combination of a movable support, a mold mounted on said support, fabricating means associated with the lower end of said mold, and a gather receiving funnel and closing member both carried by said movable support and adapted to be alternately presented to the upper end of said mold, the operation of said funnel and said member being actuated by the movement of said support.

42. In a machine for forming articles of glass, the combination of a movable support, a plurality of molds mounted on said support, forming means associated with the lower ends of said molds, a plurality of members movably mounted on said support, one of said members being associated with each of said molds, and each of said members being provided with a funnel for directing the gather of glass into its associated mold, and a closure for the upper end of said mold, and connections actuated by the movement of said support for shifting said members whereby during the feeding operation said funnel is positioned above and depressed into engagement with said mold and during the fabricating operation said closure is positioned above and depressed into engagement with said mold.

43. The combination of a mold carriage, means to rotate it about a vertical axis, an annular series of molds thereon, guides individual to said molds, a stationary cam, and means operated by the cam for moving said guides radially of the carriage into and out of position for guiding the charges of glass into the molds.

44. The combination of a mold open at its upper end to receive a charge of glass, a funnel guide, a mold closing head, a carrier on which said guide and head are mounted, means to move said carrier laterally to bring the guide and head alternately over the mold, and means to project said head downwardly to mold closing position.

45. The combination of a rotary mold carriage, molds thereon, guides individual to the molds, mold closing devices individual to the molds, carriers each supporting a guide and one of said devices, and means to move each carrier to bring said guide and closing device alternately into register with the mold.

46. The combination of a rotary mold carriage, molds thereon, guides individual to the molds, mold closing devices individual to the molds, carriers each supporting a guide and one of said devices, said carriers mounted to travel with the mold carriage, and means to reciprocate said carriers in a direction transverse to the movement thereof with the mold carriage.

47. The combination of a continuously rotating mold carriage, molds thereon, funnel guides individual to the molds, mold closing heads individual to the molds, carriers on which said guides and heads are mounted, and automatic means to reciprocate said carriers on the mold carriage.

48. A continuously rotating automatic glass forming machine comprising an annular series of complete individual article forming units, each unit comprising a receiving mold, a guide to direct a charge of glass into the mold, means to compact the glass in the mold, a closure for the charge receiving end of the mold, and means to expand the glass.

49. A continuously rotating automatic glass forming machine comprising an annular series of complete individual article forming units, each unit comprising the following elements,—a receiving mold, a guide to direct a charge of glass into the mold, means to compact the glass in the mold, a closure for the charge receiving end of the mold, and means to expand the glass,—and a series of operating cams common to all of said units for effecting the several operations of said elements.

50. A glass forming machine comprising in combination, a mold carriage, molds thereon, automatic means to rotate said carriage continuously, said molds arranged with their upper ends open to receive charges of glass, a blow head, automatic means to move it into position to close a mold after a charge of glass has been received therein, means controlled by the movement of the carriage to apply air pressure through said head to the glass in the mold, a mold closing head, means to move it into position to close the mold after the blow head has operated, and a carrier on which both said heads are mounted.

51. In a machine for forming articles of glass, the combination of a movable support, a mold mounted on said support, forming means associated with the lower end of said mold, a movable element mounted on said movable support above said mold, and provided with a gather receiving funnel and a mold closing member, and connections actuated by the movement of said support for alternately presenting said funnel and said member to the upper end of said mold.

52. In a machine for forming articles of glass, the combination of a movable support, a plurality of molds mounted on said support, forming means associated with the lower ends of said molds, a plurality of members movably mounted on said mold support, one of said members being associated with each of said molds and each of said members being provided with a funnel for directing the gather of glass into its associated mold, and a closure for the upper end of said mold, and connections actuated by the movement of said support for shifting said members whereby during the feeding operation the funnel is positioned over said mold and during the fabricating operation the closure closes the upper end of said mold.

53. In a machine for forming articles of glass, the combination of a moving mold support, a plurality of molds mounted on said support, the tops of said mold being open to receive the mold charges and the articles being fabricated in said molds from below, a vertically disposed operating member associated with each of said molds, said members being carried by the mold support in such a manner as to be longitudinally slidable and otherwise movable in relation to the support, a carrier mounted on each of said members, a feeding funnel and a mold closure mounted on each of said carriers, and cam means into engagement with which the said members are brought by the movement of the support whereby a carrier is moved to bring the funnel above the associated mold, is lowered to bring the funnel into engagement with the mold, is elevated to raise the funnel out of engagement with the mold, is moved to bring the closure above the mold, is lowered to engage the closure with the mold, and is raised to disengage the closure from the mold.

In testimony whereof I have signed this specification.

FRANK H. LOBB.

CERTIFICATE OF CORRECTION.

Patent No. 1,852,171.   Granted April 5, 1932, to

FRANK H. LOBB.

It is hereby certified that error appears in the printed specification of the above numbered patent requiring correction as follows: Page 5, line 32, for the numeral "154" read 153, and line 103, after the word "soon" insert the word as; page 7, line 16, for "saddle" read slide; page 8, line 43, for the numeral "65" read 65'; page 10, line 90, claim 18, for "thorough" read through; page 11, line 82, claim 25, for "part" read port, and page 12, line 120, claim 37, for "arrested" read associated; and that the said Letters Patent should be read with these corrections therein that the same may conform to the record of the case in the Patent Office.

Signed and sealed this 31st day of May, A. D. 1932.

(Seal)

M. J. Moore,
Acting Commissioner of Patents.